(12) United States Patent
Shingai et al.

(10) Patent No.: US 11,025,786 B2
(45) Date of Patent: Jun. 1, 2021

(54) IMAGE FORMING APPARATUS HAVING AN NFC BOARD AND USB BOARD POSITIONED THEREIN

(71) Applicant: BROTHER KOGYO KABUSHIKI KAISHA, Nagoya (JP)

(72) Inventors: Hiroyuki Shingai, Nagoya (JP); Yuji Takimoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/584,391

(22) Filed: Sep. 26, 2019

(65) Prior Publication Data

US 2020/0112644 A1   Apr. 9, 2020

(30) Foreign Application Priority Data

Oct. 3, 2018   (JP) .............................. JP2018-188583

(51) Int. Cl.
*H04N 1/00* (2006.01)

(52) U.S. Cl.
CPC ..... *H04N 1/00106* (2013.01); *H04N 1/00206* (2013.01); *H04N 1/00559* (2013.01); *H04N 1/00994* (2013.01); *H04N 1/00519* (2013.01)

(58) Field of Classification Search
None
See application file for complete search history.

(56) References Cited

U.S. PATENT DOCUMENTS

| | | | |
|---|---|---|---|
| 2005/0206667 A1* | 9/2005 | Ohama | B41J 29/023 347/9 |
| 2006/0246866 A1* | 11/2006 | Nakagawa | H04N 1/00281 455/301 |
| 2013/0141758 A1* | 6/2013 | Yoneda | G03G 15/5066 358/1.15 |
| 2013/0286433 A1* | 10/2013 | Matsushima | H04N 1/00559 358/1.15 |
| 2014/0132652 A1* | 5/2014 | Nakamura | B41J 2/14072 347/1 |
| 2018/0103165 A1* | 4/2018 | Yamamoto | H04N 1/00554 |
| 2018/0234563 A1* | 8/2018 | Ido | H04N 1/32683 |

FOREIGN PATENT DOCUMENTS

| | | |
|---|---|---|
| JP | 2014-096717 A | 5/2014 |
| JP | 2014-225748 A | 12/2014 |

\* cited by examiner

*Primary Examiner* — Miya J Williams
(74) *Attorney, Agent, or Firm* — Baker Botts L.L.P.

(57) ABSTRACT

An image forming apparatus includes: a casing including a first side surface, and a second side surface opposing the first side surface in the first direction, and an NFC board and a USB board that are disposed in the casing. The NFC board has a first board surface. The USB board has a second board surface on which a USB port is mounted. The NFC board and The USB board that are disposed in the casing at a position closer to the first side surface in the first direction than the second side surface. The second board surface is located at a level different from the first board surface in the direction normal to the first board surface. The USB board does not overlap with the NFC board when viewed in the direction normal to the first board surface.

20 Claims, 5 Drawing Sheets

IMAGE FORMING APPARATUS HAVING AN NFC BOARD AND USB BOARD POSITIONED THEREIN

CROSS-REFERENCE TO RELATED APPLICATION

This application claims priority from Japanese Patent Application No. 2018-188583 filed on Oct. 3, 2018, the content of which is incorporated herein by reference in its entirety.

TECHNICAL FIELD

Aspects described herein relate to an image forming apparatus.

BACKGROUND

A known image forming apparatus is configured to communicate with an external device, such as a smartphone and a tablet device, in compliance with a near field communication ("NFC") technology. The image forming apparatus includes an NFC board disposed apart from a power supply board, which may be a noise source. This configuration may reduce degradation of communication performances of the NFC board.

SUMMARY

For user operability, the NFC board may preferably be disposed at a front portion of the image forming apparatus. However, components, such as a control panel and a sheet output tray, are disposed at the front portion of the image forming apparatus, so that a space or an area for disposing the NFC board at the front portion is limited.

In recent years, some image forming apparatuses include a universal serial bus ("USB") port. For convenience or operability, a USB board including a USB port, as well as the NFC board, may preferably be disposed at a front portion of the image forming apparatus. If the NFC board and the USB board are disposed at a limited area of the image forming apparatus, one of the NFC board and the USB board may be a noise source for the other, which may cause electromagnetic interference.

Aspects described herein provide an image forming apparatus that includes an NFC board and a USB board. While ensuring user's convenience, the image forming apparatus may prevent or reduce degradation of communication performances due to electromagnetic interference between the NFC board and the USB board.

According to one or more aspects described herein, an image forming apparatus may comprise a casing including a first side surface, and a second side surface opposing the first side surface in a first direction; an NFC board disposed in the casing at a position closer to the first side surface in the first direction than the second side surface is to the first side surface, the NFC board having a first board surface that includes an antenna configured to allow a short-range wireless communication with an external device; and a USB board having a second board surface on which a USB port is mounted. The USB board may be disposed in the casing at a position closer to the first side surface in the first direction than the second side surface is to the first side surface, such that the second board surface is located at a level different from the first board surface in the direction normal to the first board surface, and the USB board does not overlap with the NFC board when viewed in the direction normal to the first board surface.

The NFC board and the USB board may be disposed side by side in a portion of the casing closer to the first side surface. This may ensure convenience to the user. The USB board may be disposed such that the second board surface is located at a level different from the first board surface in the direction normal to the first board surface and does not overlap with the NFC board when viewed in the direction normal to the first board surface. This configuration may prevent or reduce degradation of communication performance due to electromagnetic interference between the NFC board and the USB board.

DETAILED DESCRIPTION

Figure 1:
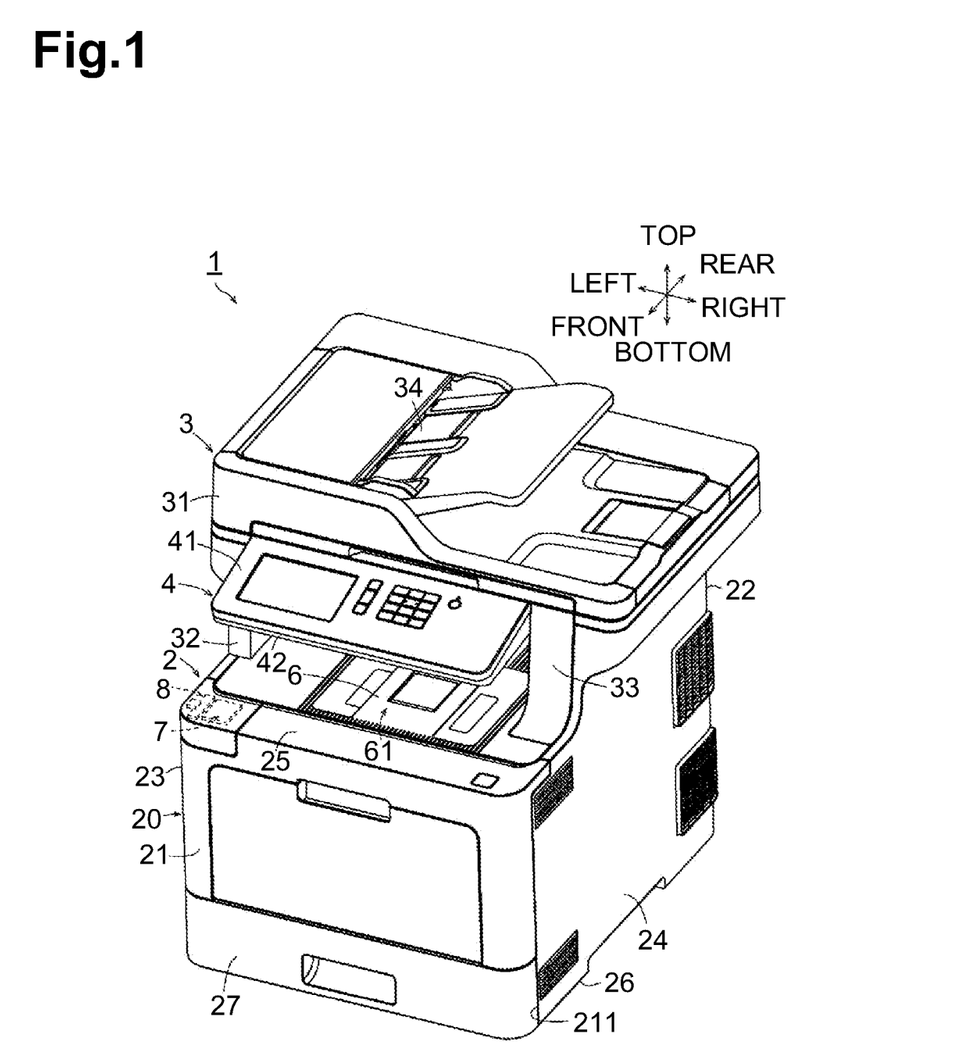
FIG. 1 is a perspective view of an image forming apparatus in an illustrative embodiment according to one or more aspects of the disclosure.

Respective directions of front, rear, left, right, top/upper, and bottom/lower are defined in conjunction with an orientation in which an image forming apparatus 1 is intended to be used, as depicted in FIG. 1. A side of the image forming apparatus 1 having an opening 211 through which a sheet tray 27 is attached or removed may be defined as a front side, and a side opposite to the front side may be defined as a rear side. A left side and a right side of the image forming apparatus 1 may be defined with respect to the image forming apparatus 1 as viewed from its front side. A side of the image forming apparatus 1 on which an upper casing 3 is disposed is the upper side. A side of the image forming apparatus 1 on which a lower casing 2 is disposed is the lower side.

[Configuration of Image Forming Apparatus]

Figure 2:
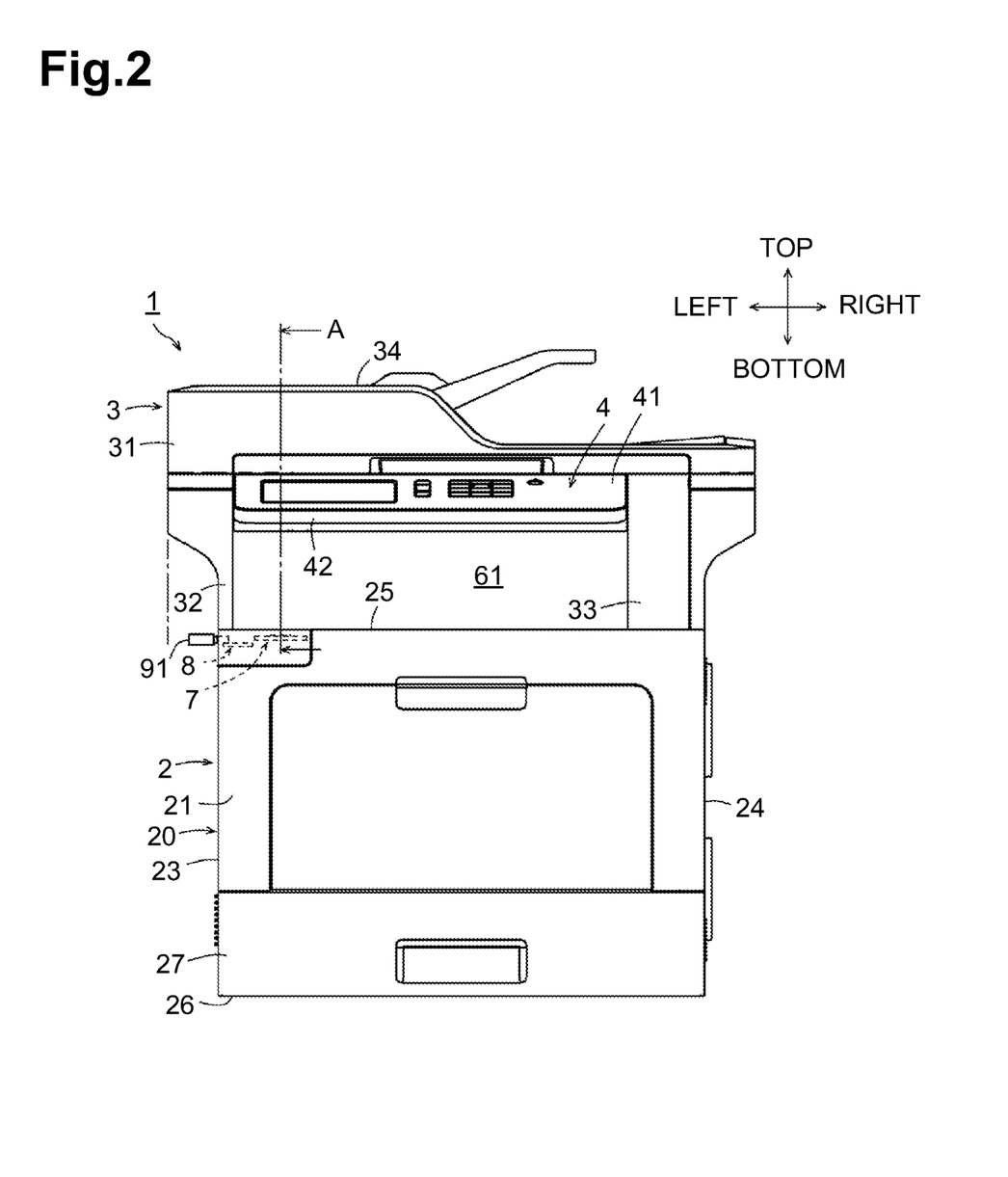
FIG. 2 is a front view of an image forming apparatus in an illustrative embodiment according to one or more aspects of the disclosure.

FIG. 1 is a perspective view of the image forming apparatus 1 according to an illustrative embodiment. FIG. 2 is a front view of the image forming apparatus 1. The image forming apparatus 1 employs an interior sheet output system. The image forming apparatus 1 includes the lower casing 2, the upper casing 3 and a control panel 4.

The lower casing 2 includes a cover 20 having a generally rectangular parallelepiped shape. The cover 20 defines an appearance of the lower casing 2. The cover 20 includes a first side surface, e.g., a front surface 21, a second side surface, e.g., a rear surface 22, a third side surface, e.g., a left surface 23, a right surface 24, a top surface 25, and a bottom surface 26. The cover 20 has the opening 211 at a lower portion of the front surface 21. Through the opening 211, the sheet tray 27 is attached or removed.

The lower casing 2 houses the sheet tray 27 configured to support a stack of one or more sheets, a conveying mechanism configured to convey a sheet from the sheet tray 27, an image forming unit configured to form an image on the sheet conveyed by the conveying mechanism, a sheet output mechanism configured to output the sheet from the image forming unit to an exterior of the lower casing 2, an NFC board 7, and a USB board 8. The sheet tray 27 is configured to move in a front-rear direction between a fully attached position (as depicted in FIG. 1) and a separated position. At the fully attached position, the sheet tray 27 is fully attached to the lower casing 2 through the opening 211. At the separated position, the sheet tray 27 is at least partially separated or removed from the lower casing 2 toward the front through the opening 211. The image forming unit may form an image based on, but not limited to, an electrophotographic method, an inkjet method, or other method.

A sheet output tray 6 is located at the top surface 25 of the lower casing 2. The sheet output tray 6 is configured to receive a sheet output by the sheet output mechanism. The sheet output tray 6 is formed on the top surface 25 of the lower casing 2 into a convex shape curving upward from the rear side toward the front side. The sheet having an image formed thereon may be output by the sheet output mechanism in a rear-to-front direction onto the sheet output tray 6.

The upper casing 3 includes a scanner 31, a left support portion 32, and a right support portion 33. The scanner 31 includes an image scanner configured to scan an image on a document placed on a document table, and an auto document feeder ("ADF") 34. The left support portion 32 is disposed below a left end portion of the scanner 31. The right support portion 33 is disposed below a right end portion of the scanner 31. The upper casing 3 is disposed above the sheet output tray 6 via an output space 61 to which a sheet is output. The output space 61 is open toward the front, so that a user may be accessible to a sheet output to the sheet output tray 6 via the output space 61.

The control panel 4 extends frontward from a front end portion of the upper casing 3. The control panel 4 has a substantially rectangular parallelepiped shape. The control panel 4 includes an upper surface 41 on which a display, such as a LCD panel, and an input device, such as a touchscreen and keys/buttons, are disposed.

[NFC and USB]

Figure 3:
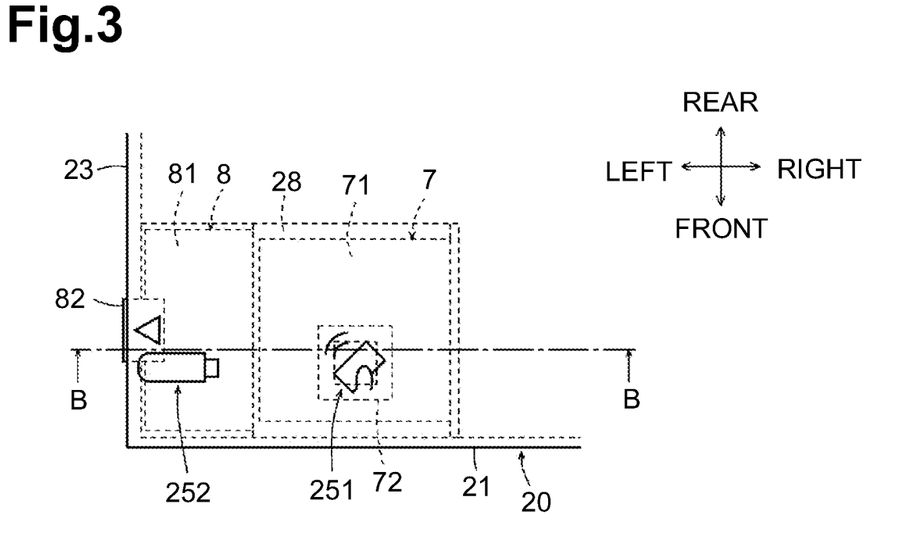
FIG. 3 is an enlarged plan view of a front left corner portion of a lower casing of an image forming apparatus in an illustrative embodiment according to one or more aspects of the disclosure.
Figure 4:
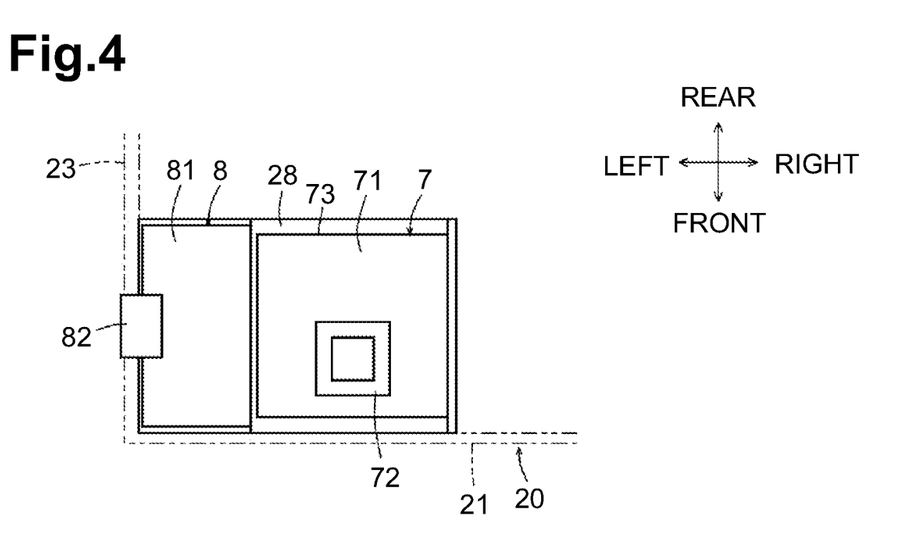
FIG. 4 is a schematic plan view of an NFC board and a USB board of an image forming apparatus in an illustrative embodiment according to one or more aspects of the disclosure.
Figure 5:
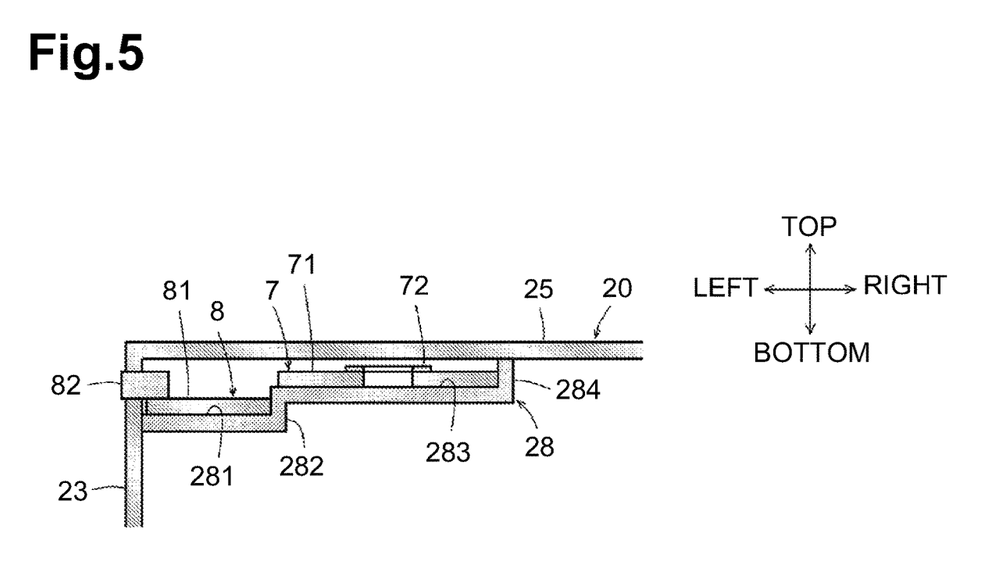
FIG. 5 is a cross-sectional view of the image forming apparatus of FIG. 3, taken along a line B-B.
Figure 6:
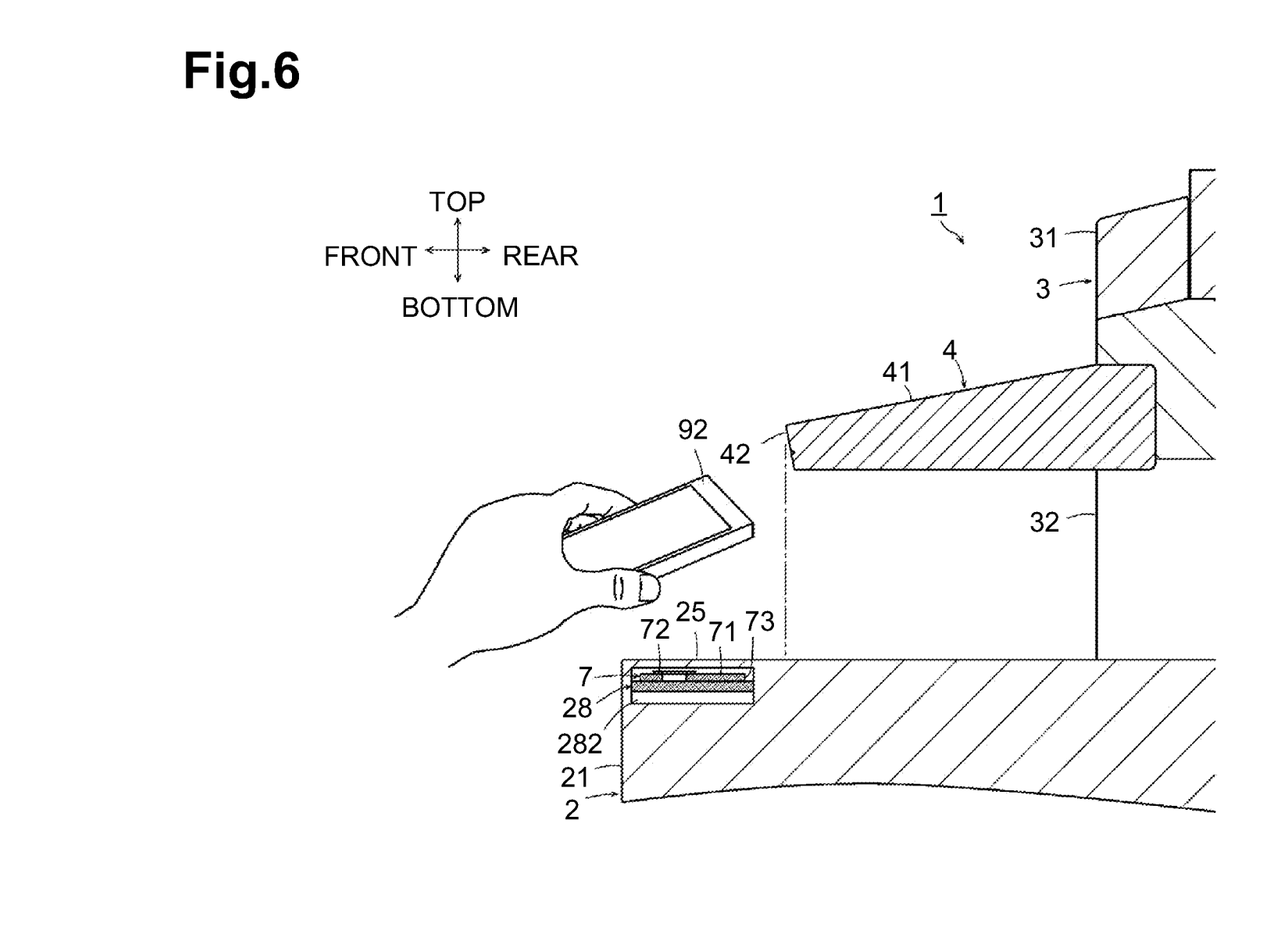
FIG. 6 is a cross-sectional view of the image forming apparatus of FIG. 2, taken along a line A-A.

As depicted in FIGS. 1 and 2, the NFC board 7 and the USB board 8 are disposed in a front portion of the lower casing 2. In the illustrative embodiment, the NFC board 7 and the USB board 8 are disposed in a left front corner portion of the lower casing 2. At the left front corner portion, the front surface 21, the left surface 23, and the top surface 25 intersect with one another. FIG. 3 is an enlarged plan view of the left front corner portion of the lower casing 2. FIG. 4 is a schematic plan view of the NFC board 7 and the USB board 8. FIG. 5 is a cross-sectional view of the image forming apparatus 1, taken along a line B-B of FIG. 3. FIG. 6 is a cross-sectional view of the image forming apparatus 1, taken along a line A-A of FIG. 2.

<NFC Indication>

As depicted in FIG. 3, the lower casing 2 has an NFC indication 251 provided, e.g., printed, at a left front corner portion of the top surface 25 of the lower casing 2. The NFC indication 251 indicates a location where an external device (e.g., a smartphone and a tablet device) having a NFC function is to be placed on or over to establish a wireless communication between the image forming apparatus 1 and the external device. Using the indication 251 as a guide, a user may bring the external device into close proximity to the NFC indication 251. As a distance between the NFC indication 251 and the external device is reduced to a predetermined distance or less, a wireless communication may be established. Bringing a external device into close proximity to the NFC indication 251 may mean that the external device contacts the top surface 25 or is close enough to the top surface 25 to establish a wireless communication.

<USB Indication>

The lower casing 2 has a USB indication 252 provided, e.g., printed, at a left front corner portion of the top surface 25 of the lower casing 2. The USB indication 252 indicates a position to which a USB device is connected. The USB indication 252 includes a schematic representation of a USB device, and a triangle indicating a location of a USB port 82. In illustrative embodiment, the USB port 82 is located at the left surface 23. The USB indication 252 may help a user to recognize the location of the USB port 82 at the left surface 23.

<Configuration of NFC Board>

As depicted in FIGS. 4 and 5, the NFC board 7 is a circuit board having a generally rectangular shape. The NFC board 7 includes a loop antenna 72 and circuits, such as a communication circuit and a detection circuit. The loop antenna 72 is disposed under the NFC indication 251. The loop antenna 72 is disposed on a first board surface, e.g., an upper surface 71, of the NFC board 7. The loop antenna 72 is configured to transmit to or receive from an external device, radio waves for NFC communication. The communication circuit is configured to process the radio waves transmitted to or received from the external device into signals. The detection circuit is configured to detect a current that flows in the loop antenna 72, thereby detecting intensities of the radio waves transmitted or received by the loop antenna 72.

<Configuration of USB Board>

The USB board 8 is a circuit board having a generally rectangular shape. The USB board 8 includes the USB port 82 and circuits. The USB port 82 is disposed on a second board surface, e.g., an upper surface 81, of the USB board 8 and protrudes leftward relative to a left end of the USB board 8. In the illustrative embodiment, the USB board 8 has a rectangular shape whose longer side (e.g., a length) extends in the front-rear direction. The USB port 82 is located at the longer side of the USB board 8. The USB port 82 is a terminal to which a terminal of a USB device is connectable.

<Arrangement of NFC Board and USB Board>

The cover 20 includes a holder 28 that fixedly holds the NFC board 7 and the USB board 8 at the cover 20. The holder 28 has a first support surface 281, a step portion 282, and a second support surface 283, and a side wall 284. The first support surface 281 has a rectangular shape and extends horizontally. The first support surface 281 is configured to support the USB board 8. The step portion 282 extends upward from the right end of the first support surface 281. The second support surface 283 extends horizontally from the upper end of the step portion 282 and is configured to support the NFC board 7. The side wall 284 extends upward from the right end of the second support surface 283. The left end of the first support surface 281 is fixed to an inner surface (e.g., a right surface) of the left surface 23 of the lower casing 2. The upper end of the side wall 284 is fixed to an inner surface (e.g., a lower surface) of the top surface 25 of the lower casing 2.

The NFC board 7 supported by the second support surface 283 is located close to the top surface 25 with little space therebetween. This may shorten a distance between the loop antenna 72 of the NFC board 7 and an external device brought on or over the top surface 25 of the cover 20, ensuring a favorable communication performance. Further, the image forming apparatus 1 may allow for a wireless communication with a user's operation of bringing an external device into close proximity to a readily accessible portion of the top surface 25. The image forming apparatus 1 thus provide increased convenience to a user.

The USB port 82 of the USB board 8 supported by the first support surface 281 is located close to the top surface 25 with little space therebetween. The USB port 82 may thus be disposed at a portion of the left surface 23 near the top surface 25 of the cover 20. This configuration may allow a user to visually identify the USB port 82 readily.

The USB board 8 has the upper surface 81 that is located at a level different from the upper surface 71 of the NFC board 7 in a top-bottom direction perpendicular or normal to the upper surface 71. In addition, the USB board 8 does not overlap with the NFC board 7 when viewed in the top-bottom direction. In the illustrative embodiment, the USB board 8 is disposed below and to the left of the NFC board 7 that is located horizontally. Additionally, the NFC board 7 and the USB board 8 are disposed at positions close to the front surface 21 of the lower casing 2.

The NFC board 7 and the USB board 8 are thus disposed side by side in a front portion of the image forming apparatus 1. This may ensure convenience to a user. The NFC board 7 and the USB board 8 may be disposed such that those boards 7 and 8 do not overlap with each other in the top-bottom direction but are arranged side by side in a horizontal direction. This configuration may prevent or reduce degradation of communication performance due to electromagnetic interference between the NFC board 7 and the USB board 8.

The USB board 8 has an area smaller than the NFC board 7. This may allow the NFC board 7, which is located to the right of the USB board 8, to be disposed closer to the left surface 23. The NFC indication 251 may not be covered or hidden by a sheet output onto the sheet output tray 6.

The USB port 82 is located at the left surface 23 of the lower casing 2. As compared with a configuration in which the USB port 82 is located at the front surface 21 of the lower casing 2, the USB board 8 may be disposed closer to the left surface 23. Consequently, the NFC board 7 located to the right of the USB board 8 may be disposed closer to the left surface 23. This configuration may shorten a distance, in the left-right direction, of an area where the NFC board 7 and the USB board 8 are disposed. This may reduce the dimension of the front surface 21 of the lower casing 2 in the left-right direction.

As depicted in FIG. 2, a particular portion of the scanner 31 extends leftward relative to the lower casing 2 (e.g., the left surface 23). A USB device 91 connected to the USB port 82 may not protrude relative to the left end of the scanner 31. If the image forming apparatus 1 is located in a room such that the left end of the image forming apparatus 1 is adjacent to or on a wall, the particular portion of the scanner 31 extending leftward may ensure a space for connecting the USB device 91 to the USB port 82.

As depicted in FIG. 6, the control panel 4 is located further toward the rear surface 22 than the NFC board 7. In other words, a front end 42 of the control panel 4 is located to a rear of a rear end 73 of the NFC board 7. The control panel 4 may not interfere with an external device 92 when a user brings the external device 92 into close proximity to the NFC indication 251 from a front side of the image forming apparatus 1. This configuration may provide convenience to the user.

[Modifications]

The USB port 82 may be disposed at the front surface 21 of the lower casing 2. This configuration may allow a user to visually identify the USB port 82 readily because the USB port 82 is located closer to the user.

The NFC board 7 and the USB board 8 may be disposed symmetrically in the lower casing 2. In other words, the USB board 8 may be disposed closer to the right surface 24 of the lower casing 2 such that the USB port 82 is located at the right surface 24, and the NFC board 7 may be disposed to the left of the USB board 8.

In another embodiment, the NFC board 7 and the USB board 8 may be disposed such that their respective upper surfaces 71 and 81 are parallel to the front surface 21 of the lower casing 2. In this configuration, the NFC indication 251 may be provided on the front surface 21 and the external device 92 may be brought into close proximity to the front surface 21.

Technical Advantages of Illustrative Embodiment

The image forming apparatus 1 includes the lower casing 2 having the front surface 21 with the opening 211, and the rear surface 22 opposing the front surface 21. The image forming apparatus 1 includes the sheet tray 27 configured to support a stack of one or more sheets and to move in the front-rear direction between the fully attached position and the separated position. At the fully attached position, the sheet tray 27 is fully attached to the lower casing 2 through the opening 211. At the separated position, the sheet tray 27 is at least partially separated from the lower casing 2 through the opening 211. The image forming apparatus 1 includes the NFC board 7 disposed in a portion of the lower casing 2 closer to the front surface 21 than the rear surface 22 is to the front surface 21. The NFC board 7 includes the loop antenna 72 on the upper surface 71. The loop antenna 72 allows a short-range wireless communication with the external device 92. The image forming apparatus 1 further includes the USB board 8 disposed in a portion of the lower casing 2 closer to the front surface 21 than the rear surface 22 is to the front surface 21. The USB board 8 includes the USB port 82 mounted on the upper surface 81. The USB board 8 is disposed such that its second board surface, e.g., the upper surface 81, is located at a level different from the upper surface 71 of the NFC board 7 in a direction normal to the upper surface 71. Additionally, the USB board 8 does not overlap with the NFC board 7 when viewed in the direction normal to the upper surface 71.

In the above-described configuration, the NFC board 7 and the USB board 8 are disposed side by side in a front portion of the image forming apparatus 1. This may ensure convenience to the user. The USB board 8 is disposed at a level different from the NFC board 7 in the direction normal to the upper surface 71, and does not overlap with the NFC board 7 when viewed in the direction normal to the upper surface 71. This configuration may prevent or reduce degradation of communication performance due to electromagnetic interference between the NFC board 7 and the USB board 8.

The image forming apparatus 1 in the illustrative embodiment includes the lower casing 2 having the top surface 25 extending from an upper end of the front surface 21 toward the rear surface 22. The top surface 25 is parallel to the upper surface 71 of the NFC board 7.

This configuration may allow for a wireless communication with the external device 92 brought into close proximity to or brought into contact with the top surface 25, providing convenience to a user.

The image forming apparatus 1 in the illustrative embodiment includes the USB board 8 having the upper surface 81, on which the USB port 82 is provided. The upper surface 81 is located closer to the top surface 25 of the lower casing 2.

This configuration may allow a user to visually identify the USB port 82 readily because the USB port 82 is located closer to the top surface 25.

The image forming apparatus 1 in the illustrative embodiment includes the lower casing 2 including the cover 20. The cover 20 defines an appearance of the lower casing 2. The cover 20 includes the holder 28 that fixedly holds the NFC board 7 at the cover 20.

This configuration may reduce the distance between the NFC board 7 and the external device 92, which may ensure preferable communication performance therebetween.

The image forming apparatus 1 in the illustrative embodiment includes the lower casing 2 having the left surface 23 extending from a side end (e.g., left end) of the front surface 21 toward the rear surface 22. The USB port 82 is located at the left surface 23.

This configuration may allow the NFC board 7 to be located closer to the left surface 23, which may reduce the dimension of the front surface 21 in the left-right direction.

The image forming apparatus 1 in the illustrative embodiment includes the scanner 31 configured to scan a document. The scanner 31 is disposed above the lower casing 2. A particular portion of the scanner 31 extends leftward relative to the USB port 82.

This configuration may ensure a space for connecting the USB device 91 to the USB port 82 when the image forming apparatus 1 is located in a room such that the left end of the image forming apparatus 1 is adjacent to or on a wall.

The image forming apparatus 1 in the illustrative embodiment includes the control panel 4 for operating the image forming apparatus 1. The control panel 4 is located further toward the rear surface 22 than the NFC board 7.

This configuration may provide increased convenience to a user because the control panel 4 may not interfere with the external device 92 when the device 92 is brought into close proximity to the NFC indication 251.

The image forming apparatus 1 in the illustrative embodiment includes the USB board 8 whose area is smaller than that of the NFC board 7.

This configuration may allow the NFC board 7 to be located closer to the left surface 23 of the lower casing 2.

What is claimed is:

1. An image forming apparatus, comprising:
   a casing including a first side surface and a second side surface opposing the first side surface in a first direction;
   an NFC board disposed in the casing at a position closer to the first side surface in the first direction than the second side surface is to the first side surface, the NFC board having a first board surface facing upward and that includes an antenna configured to allow a short-range wireless communication with an external device; and
   a USB board having a second board surface facing upward and on which a USB port is mounted, the USB board disposed in the casing at a position closer to the first side surface in the first direction than the second side surface is to the first side surface, such that the second board surface is located at a level different from the first board surface in the direction normal to the first board surface, and the USB board does not overlap with the NFC board when viewed in the direction normal to the first board surface.

2. The image forming apparatus according to claim 1, wherein the first side surface has an opening,
   wherein the image forming apparatus further comprises a sheet tray configured to support a sheet and move between an attached position and a separated position in the first direction,
   wherein at the attached position, the sheet tray is fully attached to the casing through the opening, and
   wherein at the separated position, the sheet tray is at least partially separated from the casing through the opening.

3. The image forming apparatus according to claim 1, wherein the casing includes a top surface that extends from an upper end of the first side surface toward the second side surface, and
   the first board surface of the NFC board is parallel to the top surface.

4. The image forming apparatus according to claim 3, wherein the second board surface on which the USB port is mounted is located in the casing at a position closer to the top surface.

5. The image forming apparatus according to claim 1, wherein the casing includes a cover defining an appearance of the casing, and
   the cover includes a holder that fixedly holds the NFC board at the cover.

6. The image forming apparatus according to claim 1, wherein the casing includes a third side surface that extends from a side end in a second direction of the first side surface toward the second side surface, wherein the second direction is perpendicular to the first direction, and
   the USB port is disposed at the third side surface.

7. The image forming apparatus according to claim 6, further comprising a scanner disposed above the casing and configured to scan a document, and
   the scanner has a portion extending in the second direction away from the third side surface.

8. The image forming apparatus according to claim 1, further comprising a control panel for operating the image forming apparatus,
   wherein the NFC board does not overlap with the control panel when viewed in the direction normal to the first board surface.

9. The image forming apparatus according to claim 8, wherein the control panel is disposed closer to the second side surface than the NFC board.

10. An image forming apparatus, comprising:
    a casing including a first side surface and a second side surface opposing the first side surface in a first direction;
    an NFC board disposed in the casing at a position closer to the first side surface in the first direction than the second side surface is to the first side surface, the NFC board having a first board surface that includes an antenna configured to allow a short-range wireless communication with an external device; and
    a USB board having a second board surface on which a USB port is mounted, the USB board disposed in the casing at a position closer to the first side surface in the first direction than the second side surface is to the first side surface, such that the second board surface is located at a level different from the first board surface in the direction normal to the first board surface, and the USB board does not overlap with the NFC board when viewed in the direction normal to the first board surface; and wherein the USB board has an area smaller than the NFC board.

11. The image forming apparatus according to claim 10, wherein the second board surface on which the USB port is mounted is located in the casing at a position closer to the top surface.

12. The image forming apparatus according to claim 10, wherein the casing includes a third side surface that extends from a side end in a second direction of the first side surface toward the second side surface, wherein the second direction is perpendicular to the first direction, and the USB port is disposed at the third side surface.

13. The image forming apparatus according to claim 10, further comprising a control panel for operating the image forming apparatus, wherein the NFC board does not overlap with the control panel when viewed in the direction normal to the first board surface.

14. The image forming apparatus according to claim 13, wherein the control panel is disposed closer to the second side surface than the NFC board.

15. An image forming apparatus, comprising:

a casing including a first side surface and a second side surface opposing the first side surface in a first direction;

an NFC board disposed in the casing at a position closer to the first side surface in the first direction than the second side surface is to the first side surface, the NFC board having a first board surface that includes an antenna configured to allow a short-range wireless communication with an external device; and a USB board having a second board surface on which a USB port is mounted, the USB board disposed in the casing at a position closer to the first side surface in the first direction than the second side surface is to the first side surface, such that the second board surface is located at a level different from the first board surface in the direction normal to the first board surface, and the USB board does not overlap with the NFC board when viewed in the direction normal to the first board surface; and wherein the NFC board is positioned above the USB board.

16. The image forming apparatus according to claim 15, further comprising:

a first support surface configured to support the USB board;

a second support surface configured to support the NFC board; and a step portion extends upward from an end of the first support surface to an end of the second support surface.

17. The image forming apparatus according to claim 15, wherein the second board surface on which the USB port is mounted is located in the casing at a position closer to the top surface.

18. The image forming apparatus according to claim 15, wherein the casing includes a third side surface that extends from a side end in a second direction of the first side surface toward the second side surface, wherein the second direction is perpendicular to the first direction, and the USB port is disposed at the third side surface.

19. The image forming apparatus according to claim 15, further comprising a control panel for operating the image forming apparatus, wherein the NFC board does not overlap with the control panel when viewed in the direction normal to the first board surface.

20. The image forming apparatus according to claim 19, wherein the control panel is disposed closer to the second side surface than the NFC board.

* * * * *

UNITED STATES PATENT AND TRADEMARK OFFICE
CERTIFICATE OF CORRECTION

| | | |
|---|---|---|
| PATENT NO. | : 11,025,786 B2 | Page 1 of 1 |
| APPLICATION NO. | : 16/584391 | |
| DATED | : June 1, 2021 | |
| INVENTOR(S) | : Hiroyuki Shingai et al. | |

It is certified that error appears in the above-identified patent and that said Letters Patent is hereby corrected as shown below:

In the Claims

Claim 7, Column 8, Line 39, please change "a document, and" to --a document,--.

Claim 7, Column 8, Line 40, please change "the scanner has" to --wherein the scanner has--.

Claim 16, Column 10, Line 16, please change "portion extends upward" to --portion extending upward--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*